No. 761,381.

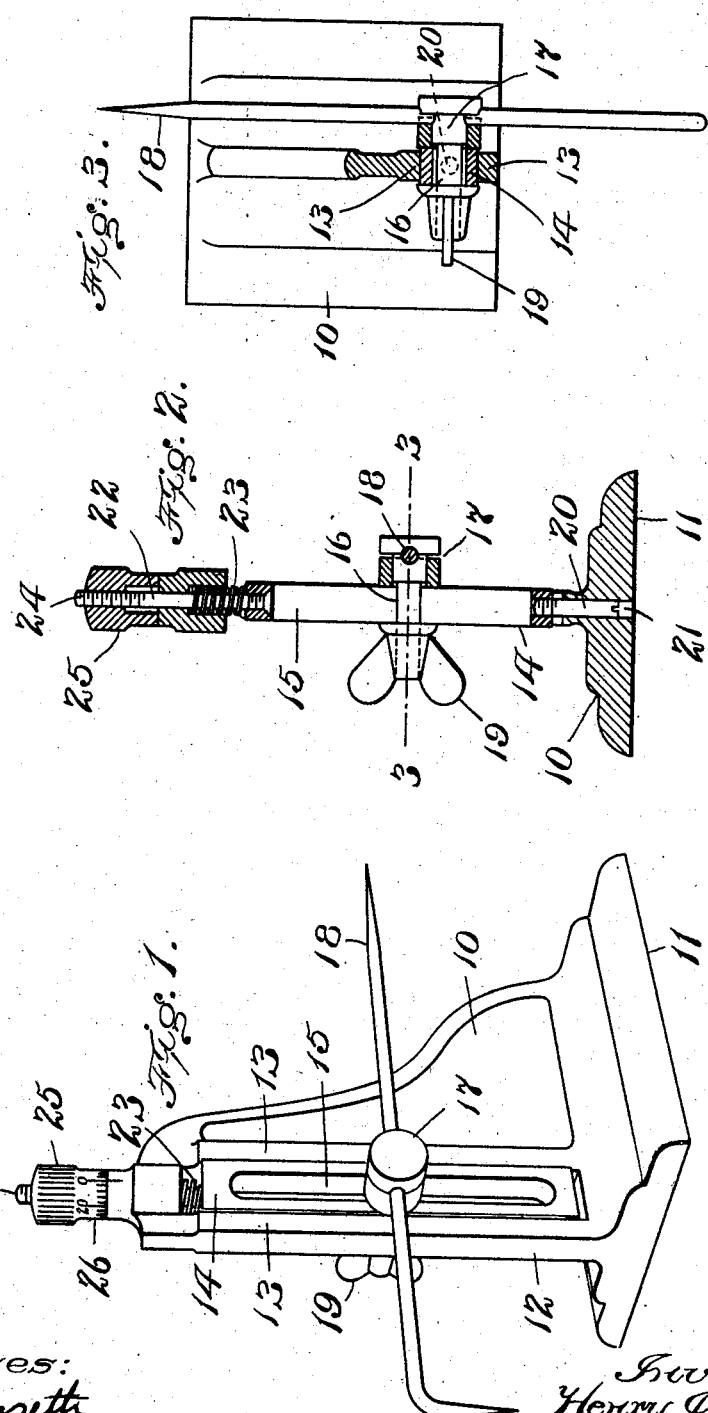

Patented May 31, 1904.

UNITED STATES PATENT OFFICE.

HENRY J. HJORTH, OF CAMBRIDGE, MASSACHUSETTS, ASSIGNOR TO THOMAS E. O'BRIEN, OF WATERTOWN, MASSACHUSETTS, AND JOSEPH F. EATON, OF BOSTON, MASSACHUSETTS.

SURFACE-GAGE.

SPECIFICATION forming part of Letters Patent No. 761,381, dated May 31, 1904.

Application filed October 10, 1903. Serial No. 176,481. (No model.)

*To all whom it may concern:*

Be it known that I, HENRY J. HJORTH, of Cambridge, in the county of Middlesex and State of Massachusetts, have invented certain new and useful Improvements in Surface-Gages, of which the following is a specification.

This invention relates to surface-gages; and the object thereof is to increase the accuracy, durability, and cheapness thereof. For accuracy and non-springing the needle or scratch-awl should be supported as rigidly as possible and equally rigid in all adjustments, which consideration, it will be observed, is fulfilled by the construction about to be described, such construction also securing the remaining aforesaid objects, as will appear.

Of the accompanying drawings, Figure 1 represents a perspective view of a surface-gage embodying my invention. Fig. 2 represents a transverse vertical section thereof. Fig. 3 represents a section on line 3 3 of Fig. 2.

The same reference characters indicate the same parts in all the figures.

In the drawings, 10 is a frame, base, or standard having two flat surfaces 11 12 for seating the instrument on vertical or horizontal surfaces, said frame being formed with vertical parallel-faced guides 13 13, separated by a rectangular space, within which is mounted a slide 14, the thickness of the latter being slightly greater than the thickness of the guides, so that the slide projects slightly beyond the guides laterally in both directions. The slide is formed with an elongated slot 15 parallel to the guides 13 and through which passes the bolt 16 of a clamping-holder 17 for the needle or scratch-awl 18, said holder or fastening being clamped by a thumb-nut 19. It will be obvious that the slot 15 permits a wide and quick adjustment of the scratch-awl in a direction parallel to the guides 13, the clamping-holder 17 being also capable of angular adjustment and serving to clamp the scratch-awl firmly to the slide in any position to which the awl has been adjusted.

In the lower end of the slide 14 is fixed a guide-pin 20, mounted in a suitable guiding-aperture 21 in the frame 10, and in the upper end of the slide is mounted a guide-pin 22, passing through and projecting beyond the upper end of the frame. A spring 23, surrounding the pin 22 and let into a socket in the frame, presses downwardly on the slide 14. The upper end of the pin is screw-threaded at 24 and engaged by a complementally-threaded nut 25, which may have micrometer graduations 26 thereon, as shown in Fig. 1. This nut seats against the upper end of the frame 10 and upon being turned in the proper direction draws the slide 14 upwardly in its guides. Turning the nut in the opposite direction allows the spring 23 to press the slide downwardly. By manipulating the nut 25 the needle or awl may be given a fine adjustment through a limited movement of the slide 14 after the awl 18 has been fixed at approximately the proper adjustment by moving the clamping-holder 17 along the slide 14 and securing it to the slide. The whole construction is extremely rigid and such that no springing of the support of the needle can take place. The shape and relation of the slide 14 and its guides are such that the needle is supported equally rigidly in any position and the slide is prevented from turning. The pins 20 22 serve to guide the vertical movements of the slide and prevent lateral displacement thereof from between the guides 13.

I claim—

1. A surface-gage comprising a base or standard formed with opposite guides separated by a space, a slide mounted between said guides and formed with a slot elongated longitudinally of the guides, a needle-holder occupying said slot and adjustable longitudinally thereof, said needle-holder provided with means for clamping it to the slide at different adjustments, and means for imparting a fine adjustment to the slide.

2. A surface-gage comprising a base or standard having guides, a slide mounted in said guides and formed with a longitudinal slot, a needle-holder adjustable in said slot, a spring interposed between the slide and standard for impelling the slide in one direction, a screw-threaded member on the slide, and a rotary complemental screw-threaded member bearing against the standard for moving the slide against the force of said spring.

3. A surface-gage comprising a base or standard with opposite guides having parallel faces separated by a space, a slide mounted between said faces and removable laterally from between the guides, a needle-holder adjustable longitudinally on said slide, and longitudinal pins at opposite ends of the slide mounted in suitable guides in the standard and serving to prevent such lateral removal.

4. A surface-gage comprising a base or standard having opposite guides, a slide mounted between said guides, a needle-holder adjustable on said slide, longitudinal pins at opposite ends of the slide mounted in suitable guides on the standard, one of said pins being threaded, a nut on said threaded pin bearing against the standard, and a spring surrounding said pin and interposed between the slide and standard.

In testimony whereof I have affixed my signature in presence of two witnesses.

HENRY J. HJORTH.

Witnesses:
EDWARD E. BARTLETT,
ALZADA E. BARTLETT.